L. E. McKINNON & A. W. SOUTHALL.
ELECTRIC WELDING MACHINE.
APPLICATION FILED JUNE 17, 1908. RENEWED OCT. 28, 1912.

1,064,078.

Patented June 10, 1913.
5 SHEETS—SHEET 2.

Fig. 2.

Witnesses:
E. A. Volk
A. G. Dimond.

Inventors.
Lachlan E. McKinnon,
Albert W. Southall,
by Wilhelm, Parker & Hand
Attorneys.

UNITED STATES PATENT OFFICE.

LACHLAN E. McKINNON AND ALBERT W. SOUTHALL, OF BUFFALO, NEW YORK, ASSIGNORS, BY MESNE ASSIGNMENTS, TO McKINNON CHAIN COMPANY, OF BUFFALO, NEW YORK, A CORPORATION.

ELECTRIC WELDING-MACHINE.

1,064,078. Specification of Letters Patent. Patented June 10, 1913.

Application filed June 17, 1908, Serial No. 439,040. Renewed October 28, 1912. Serial No. 728,266.

*To all whom it may concern:*

Be it known that we, LACHLAN E. McKINNON, a subject of the King of Great Britain, residing at Buffalo, in the county of Erie and State of New York, and ALBERT W. SOUTHALL, a citizen of the United States, residing at Buffalo, in the county of Erie and State of New York, have invented a new and useful Improvement in Electric Welding-Machines, of which the following is a specification.

This invention relates to electric welding machines and has reference mainly to machines for welding the links of chains although the invention in some of its features or aspects is also applicable to machines for welding other articles.

The objects of the invention are the construction of an automatic welding machine which operates rapidly and efficiently; also to provide the machine with means for automatically breaking the welding circuit and stopping the machine in the event that a link or other article to be welded is not properly fed between the electrodes, or is burned or improperly welded; also to provide the machine with an automatic alarm which is operated when the machine is thus automatically stopped.

In the accompanying drawings, consisting of five sheets.

Like reference characters refer to like parts in the several figures.

Briefly stated, the machine herein described in detail is organized and operates as follows:

A pair of opposite electrodes are arranged to reciprocate horizontally toward and from each other. The chain is advanced by a reciprocating and oscillating feed chuck to place a link in position for welding while the electrodes are separated. The electrodes then approach each other and grip the link between them, pressing the lapped ends of the link tightly together, and an electric circuit is closed through the electrodes and the interposed link, whereby the ends of the link are welded together. While the link is held by the electrodes the feed chuck recedes and takes a new hold on the chain. The welding circuit is then broken and the electrodes are separated. The chuck is then given a quarter turn and advanced to place the next link in position between the electrodes which again approach and grip the link and the welding circuit is again closed. The welding circuit is thus closed after the electrodes grip each link and kept closed just long enough to effect the welding and is broken before the electrodes separate. The chuck is turned a quarter revolution first in one direction and then in the opposite direction to place the successive links in position between the electrodes. If for any reason a link fails to be placed between the electrodes they will approach nearer together than normally, or if a link is burned or unduly heated the electrodes will also move closer together than normally. In either event an automatic device is operated which breaks the circuit and stops the machine and at the same time an alarm or signal is operated to give warning to the attendant so that he will be apprised that something is wrong and can remedy the defect so as thereby to prevent a chain from being made with an imperfect link. After the machine is once started it is entirely automatic in action.

A represents the frame of the machine which may be of any suitable construction and is preferably provided with a horizontal table 20 from which rise standards or columns 21 connected at the top by a cross piece 22 from which is suspended a transformer B of ordinary construction for reducing the current furnished by the service line to a suitable voltage for the welding operation.

23 and 24 represent two opposite movable electrodes which are connected by conductors 25 to the transformer and are arranged to reciprocate horizontally toward and from each other on the table 20.

Figure 1:
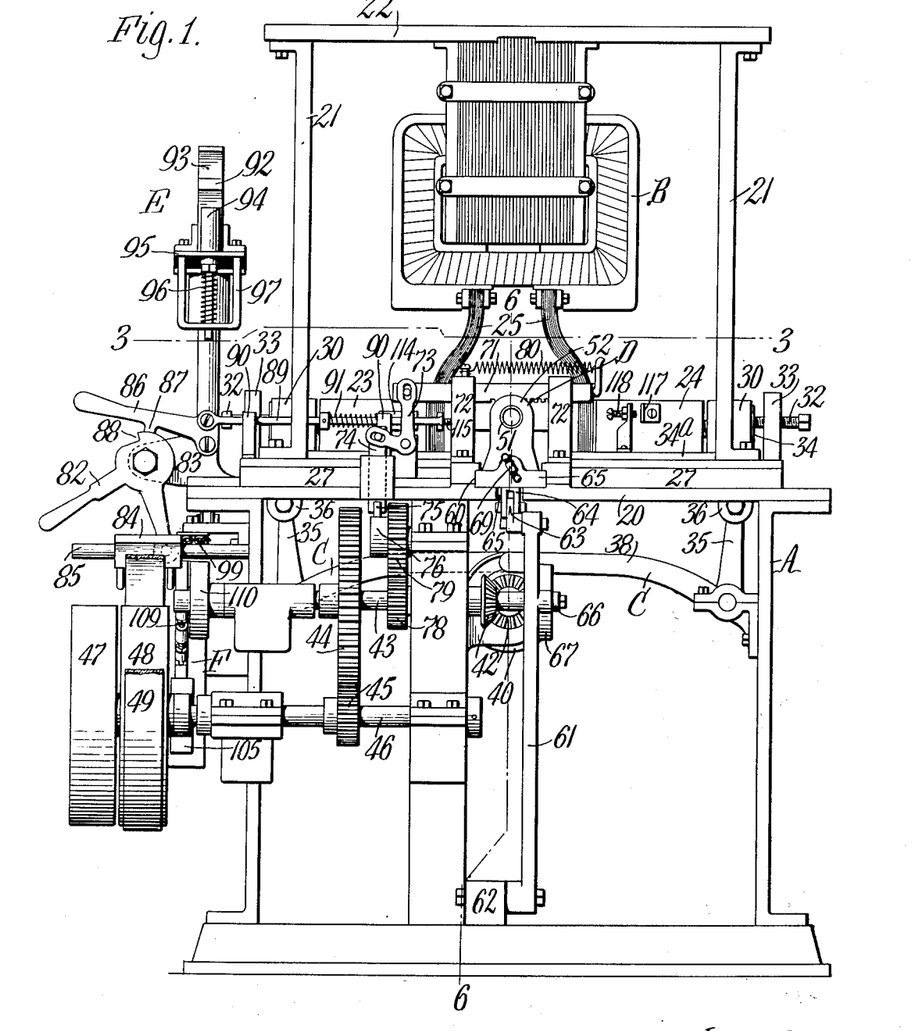
Figure 1 is a side elevation, partly in section, of an electric chain welding machine embodying the invention.
Figure 2:
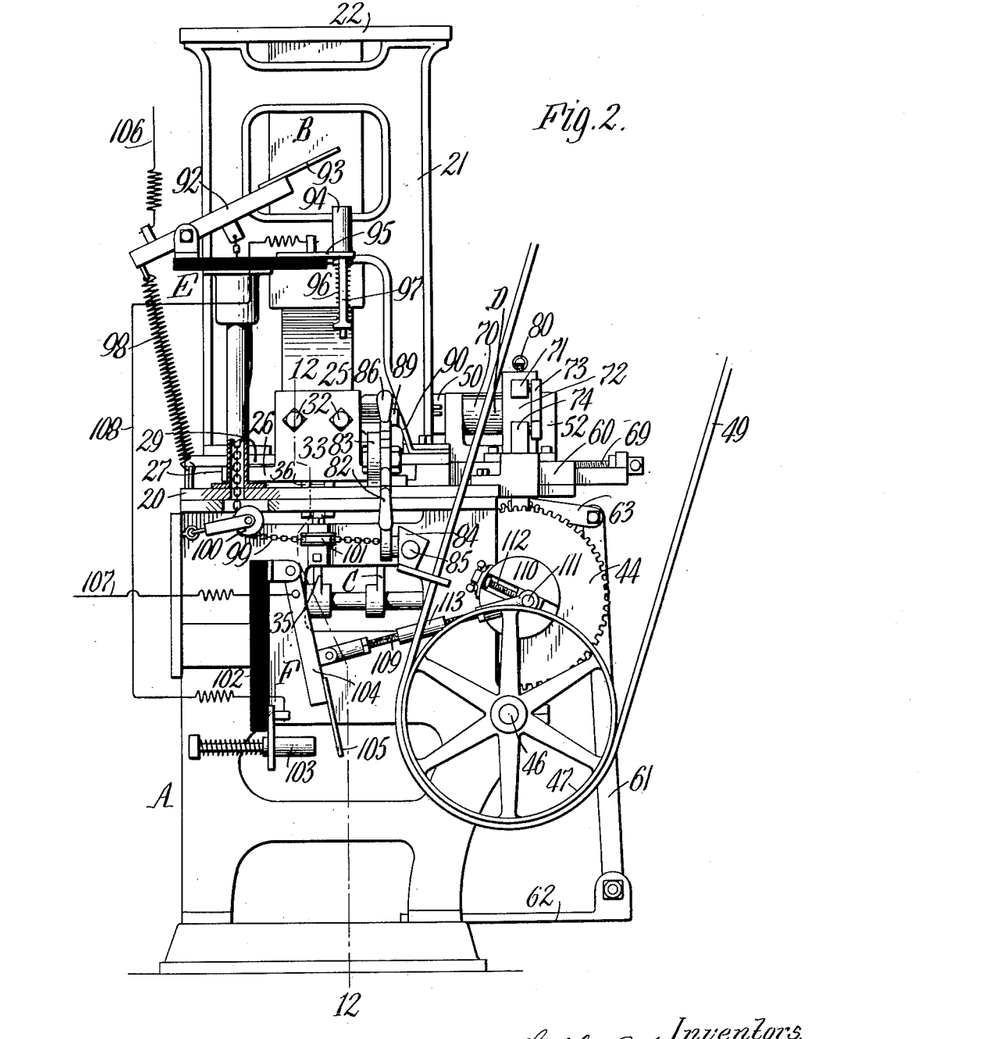
Fig. 2 is an end elevation thereof.
Figure 3:
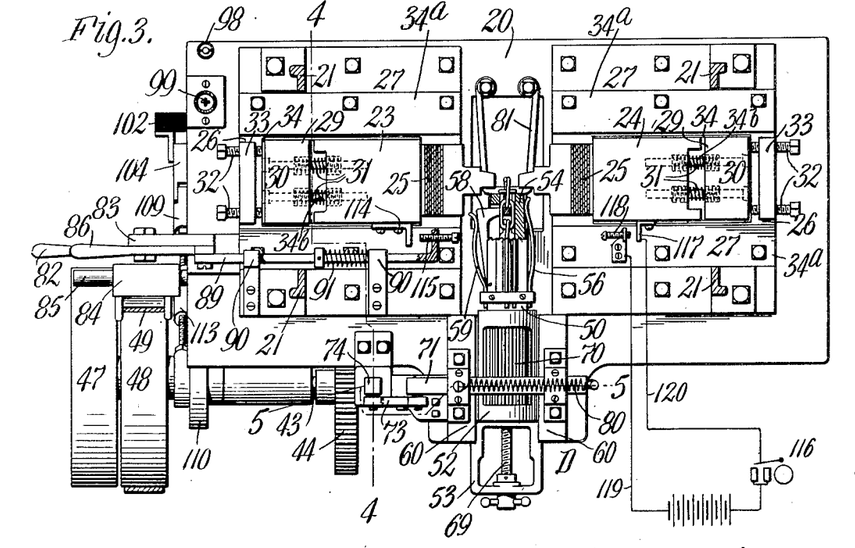
Fig. 3 is a sectional plan thereof in line 3—3, Fig. 1.
Figures 4, 5:
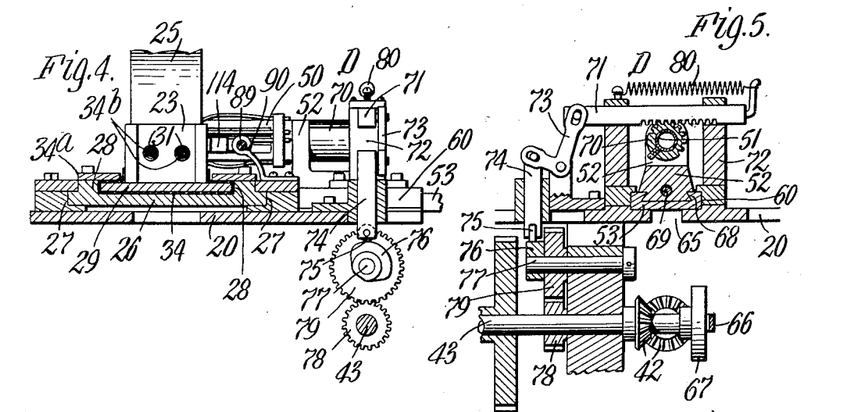
Fig. 4 is a fragmentary sectional elevation thereof in line 4—4, Fig. 3, showing the feed chute and its operating mechanism.
Fig. 5 is a transverse sectional elevation of these parts in line 5—5, Fig. 3.
Figure 12:
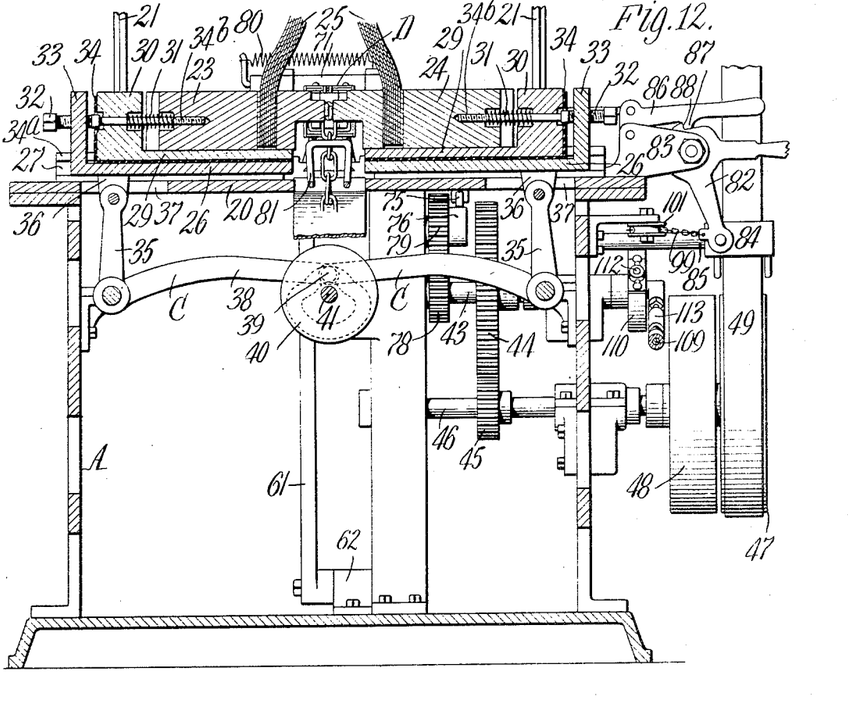
Fig. 12 is a transverse sectional elevation of the machine in line 12—12, Fig. 2.

The electrodes are movably mounted and reciprocated by the following means: 26, Figs. 2, 4, 6 and 12, represents two sliding carriages which are movable horizontally toward and from each other in guide ways 27, Figs. 3 and 4, on the table 20. Each carriage 26 is provided with longitudinal guides 28 in which adjustable seat blocks 29 for the electrodes are confined. The seat blocks are provided at their outer ends with upright extensions 30, Fig. 12, and springs 31 are arranged between these extensions and the outer ends of the electrodes in pockets in these parts. Adjusting screws 32, Figs. 1, 2, 3 and 12, pass through upright extensions 33 at the outer ends of the carriages and bear against the outer ends of the adjustable seat blocks. Suitable insulating material, for instance, sheet rubber, 34, Figs. 4 and 12, is arranged between the seat blocks and the carriages to insulate the electrodes from the latter. The seat blocks are clamped in their adjusted position on the carriages by gibs or plates 34ª. The electrodes 23 and 24 are each connected with its seat block by longitudinal bolts 34ᵇ which are secured to the electrode and permit of a limited movement of the latter on the block but cause the electrode to move outwardly with the block and carriage when the slack between the bolt and the seat block has been taken up. The carriages are reciprocated simultaneously in opposite directions, or toward and from each other, by bell crank levers C, Figs. 1, 2 and 12, which have their upright arms 35 connected to lugs 36 depending from the carriages through slots 37 in the table 20, and which engage with their inwardly extending arms 38 carrying studs or rollers 39 with similar grooved cams 40, Figs. 6 and 12. These cams are secured to a horizontal shaft 41 journaled longitudinally in the machine and connected by bevel gears 42 to a shaft 43, Figs. 1, 5 and 6, which is connected by gear wheels 44 and 45 to a horizontal shaft 46, Figs. 1, 2, and 12, provided at its outer end with tight and loose pulleys 47 48 and constituting the main drive shaft of the machine. The belt 49 for driving the shaft is adapted to be shipped from one pulley to the other, as hereinafter explained, for stopping and starting the machine. The cams 40 are so shaped as to move the electrodes simultaneously in opposite directions and hold them stationary a suitable length of time at the outer and inner limits of their movements.

By the described means of mounting the electrodes the carriages 26 and seat blocks 29 are positively moved toward each other but the electrodes are pressed toward each other by the springs 31 yieldingly to grip and hold the chain links between the electrodes with a yielding pressure. While, therefore, the carriages and seat blocks are moved a definite distance by their actuating mechanism, the electrodes, when they engage the link between them, are arrested and the carriages and seat blocks continue their inward movement, thereby compressing the springs and holding the electrodes firmly against the link. In the event that a link is not fed into proper position between the electrodes, or in the event that the link is burned or unduly heated and softened, the springs will move the electrodes inwardly beyond their normal position, and this will operate means hereinafter described to stop the machine and break the welding circuit. The adjusting screws connecting the seat blocks to the carriages permit the seat blocks to be adjusted on the carriages to properly operate upon lengths of different thickness.

Figure 6:
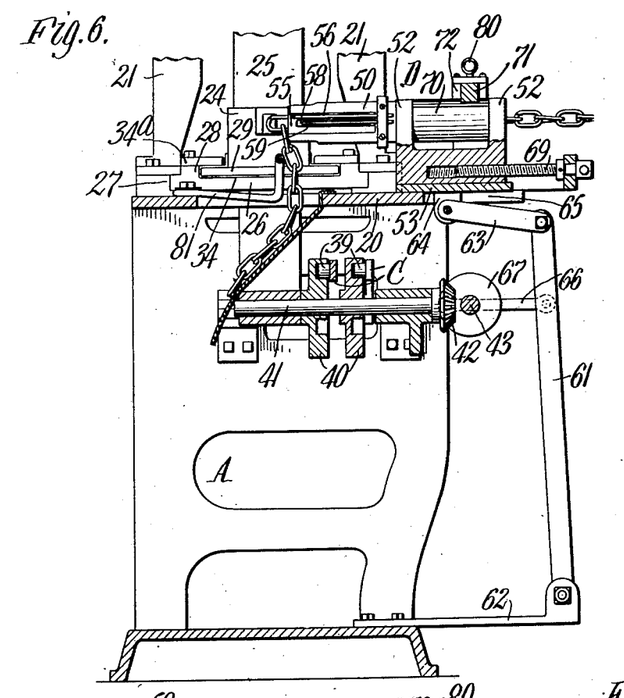
Fig. 6 is a fragmentary longitudinal sectional elevation of the machine in line 6—6, Fig. 1.
Figures 7, 8, 9, 10, 11:
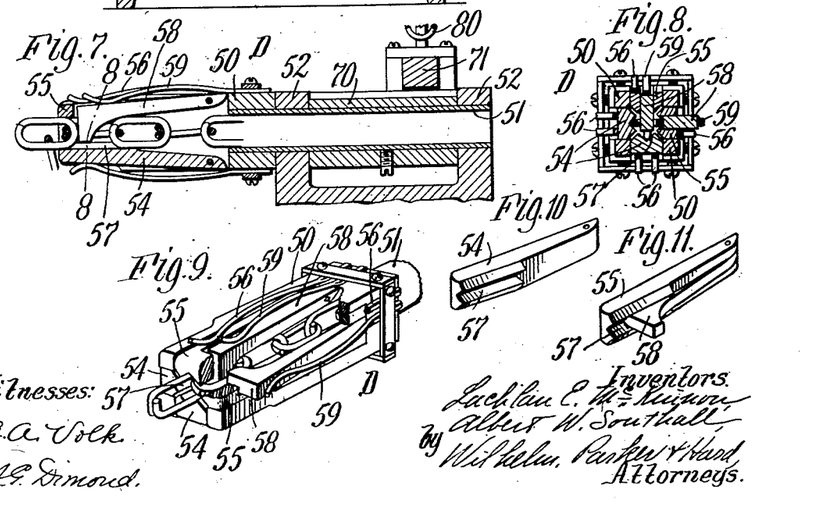
Fig. 7 is a sectional elevation, on an enlarged scale, of the chain feed chuck.
Fig. 8 is a transverse sectional elevation thereof in line 8—8, Fig. 7.
Fig. 9 is a broken perspective view thereof.
Figs. 10 and 11 are perspective views detached of a pair of coöperating guides and one dog of the feed chuck.

D, Figs. 3–11, represents the chuck for feeding the chain forward to place the links successively in position between the electrodes for welding. The chuck preferably consists of a skeleton frame or head 50 which is secured to the inner end of a hollow shaft or sleeve 51, Fig. 7, which is journaled to oscillate in bearings 52 on a carriage 53 mounted to reciprocate longitudinally in the machine toward and from the electrodes. The chuck is provided on each of its four sides with guide blocks 54 55 which are pivoted in longitudinal slots in the chuck head. The forward ends of these guide blocks are pressed inwardly or toward each other by springs 56 which are secured at their outer or rear end to the chuck head. The forward ends of the guide blocks are provided at their inner sides with guide grooves 57 for holding the links in position. One link of the chain enters the guide grooves in the opposing guide blocks of one pair and the next link, which occupies a position substantially at right angles to the first link, enters the grooves of the other pair, so that the guide blocks hold successive links at right angles to each other, as shown in Figs. 7 and 9. One guide block 55 of each pair is slotted and a feed dog 58 is pivoted therein and the forward end thereof is pressed inwardly by a spring 59 secured at its outer or rear end to the chuck head. The two feed dogs occupy a position at right angles to each other and the nose or free end of one dog enters the opening or loop of a link while the other dog rests on the side bar of the link, as shown in Fig. 9. When the feed chuck is advanced the dog engaging in the link will advance the chain, and when the chuck is retracted the chain being held stationary by the electrodes which grip one of the links, the dog which moved the chain forward will draw out of the link and slide rearwardly onto the next link and will rest on the side bar of this link while the other dog will enter this link and advance the chain at the next advance movement of the feed chuck.

The carriage 53 on which the chuck is journaled is arranged to slide horizontally in guide ways 60, Figs. 1, 3, and 5, on the table, and is reciprocated by suitable means which, in the machine shown, consist of a lever 61 fulcrumed at its lower end on a bracket 62 projecting from the lower portion of the frame, and connected at its upper end by a link 63 to a lug 64 depending from the carriage through a slot 65 in the table. The lever 61 is connected by a pitman 66 to a crank wheel 67 secured to the counter shaft 43. The bearing block for the chuck is adjustable in a guide way 68 on the carriage 53 and is adjusted by a screw 69 to insure the proper position of the link between the electrodes.

As the alternate links of the chain occupy planes substantially at right angles to each other and each link must be presented in the same position to the electrodes, it is necessary to oscillate the chuck a quarter turn for each advance movement thereof. For thus oscillating the chuck a quarter turn first in one direction and then in the other, an elongated mutilated gear wheel 70 is secured to the hollow chuck shaft between its bearings and is provided at one side with elongated gear teeth which mesh with the teeth of a rack 71 of less width. This rack is movable endwise in bearings 72 rising from the table at opposite sides of the chuck carriage and is operated in one direction by a lever mechanism constructed as follows:

A bell crank lever 73, Fig. 5, is fulcrumed on the table and has one arm connected to the rack bar and the other arm connected to a rod or plunger 74 which extends through a guide hole in the table and is provided at its lower end with an anti-friction roller 75 which rests on the surface of a cam 76 secured to a shaft 77 driven from the counter shaft 43 by gear wheels 78 79. The elongated gear on the hollow chuck shaft is longer than the distance traveled by the chuck carriage, so that the toothed rack will remain in engagement with this mutilated gear to oscillate the chuck while the latter is being advanced to place a link between the electrodes. The rack bar is returned by a spring 80.

81, Figs. 3 and 6, represents a restraining device for holding the links of the chain which have been welded out of the path of the electrodes when a new link is advanced to be welded. This restraining device consists of a U-shaped rod secured at its ends to the table and having an upright loop extending upwardly beneath the electrodes in position to engage the welded links which depend from the chuck.

82, Figs. 1, 2, 3 and 12, represents a hand lever for starting and stopping the machine. This lever is fulcrumed to a bracket 83 at one side of the machine and has an arm connected to a belt shipper 84 which slides on a horizontal guide rod 85 and straddles the drive belt 49.

86 is a latch lever which is fulcrumed on the bracket 83 and is provided with a lug 87 adapted to engage a shoulder or projection 88 on the hub of the starting lever to hold the same in the position to which it is moved to ship the belt onto the tight pulley 47 to start the machine, as represented in Fig. 12. A rod 89 connected to the latch lever 86 extends horizontally through guide bearings 90 on the table at one side of the electrodes. A spring 91 on this rod pushes the rod endwise so as to press the latch lever against the starting lever to cause it to engage and hold the starting lever when the lever has been moved to start the machine.

E, Figs. 1 and 2, represents a main or starting switch of any suitable construction for closing the welding circuit when the machine is started and breaking the circuit when the machine is stopped. The switch shown in the drawings has a pivoted arm 92 connected to one terminal of the electric circuit and a contact piece 93 at its free end adapted to engage a coöperating contact post 94, which latter is preferably mounted to slide in a plate 95 secured to the switch base and is yieldingly supported by a spring 96 in a guide yoke 97.

98 represents a spring which is connected at opposite ends to the pivoted switch arm 92 and to a suitable stationary part of the machine frame and acts to open the switch arm when released. The switch arm is connected by a chain 99, or other suitable means, to the starting lever 82 so that when the latter is moved to start the machine the chain is pulled and moves the pivoted switch arm into engagement with the contact post 94. The connecting chain 99 preferably passes through a hollow supporting post for the switch E and around guide pulleys 100 101.

F represents a switch or circuit breaker which is periodically operated in unison with the movements of the electrodes toward and from the welding position in such manner that the welding circuit is closed every time the electrodes are moved to the welding position and opened just before the electrodes begin their separating movement. This periodical switch is actuated from a suitable shaft of the machine and is closed and opened regularly for every welding operation, while the main switch E is closed by starting the machine and remains closed until it is opened by stopping the machine. This stopping may take place when the periodical switch is closed but in that case the welding circuit is opened at the main switch. The switch shown in the drawings comprises an insulating base 102 secured on the frame A at one side thereof and having a spring-pressed contact piece 103, and a pivoted switch arm 104 provided with a contact piece 105 adapted to be moved against the spring-pressed contact 103. One terminal 106 of the supply circuit is connected to the movable arm of the main switch E and the other terminal 107 is connected to the movable arm of the secondary switch F. The two spring-pressed contact pieces of the two switches are connected by a conductor 108, so that when the main switch E is closed and the arm of the secondary switch F is moved against the coöperating contact piece the circuit will be closed.

The movable arm of the secondary switch F is oscillated to open or close the circuit at the proper times by any suitable means, such, for instance, as a pitman 109 connecting the switch arm with a crank wheel 110 secured to the end of the counter shaft 43. The wrist pin 111 of the crank wheel is preferably adjustable radially by means of a screw 112 to regulate the throw of the crank, and the pitman is preferably adjustable in length by a turn buckle 113. By lengthening or shortening the pitman the movable arm of the secondary switch can be caused to engage the spring-pressed contact sooner or later, thereby regulating the period during which the circuit remains closed.

The automatic device for breaking the circuit and stopping the machine in the event that no link is fed between the electrodes, or when the electrodes are permitted to move toward each other beyond the normal position by reason of a link being burned or excessively heated or softened, consists of a finger or projection 114, Fig. 3, secured to the electrode 23 and adapted to engage a set screw 115 on the rod 89 which is connected to the latch 86 for the starting lever 82. In the normal operation of the machine the electrodes do not approach near enough to each other for the finger 114 to strike the set screw 115, but if for any reason the electrodes move toward each other beyond the normal position, the finger will strike the set screw and trip the latch 86, see Fig. 1, thereby releasing the starting lever and the latter will be moved to ship the belt onto the loose pulley by the spring 98 connected to the movable arm of the main switch E.

116, Fig. 3, represents an electric alarm which is actuated or sounded when the electrodes move inwardly beyond their permissible or normal position. The circuit through the alarm is closed by a contact piece 117, Figs. 1 and 3, on one of the electrodes coming in contact with a stationary contact piece 118 which is preferably adjustable. These contacts are connected with the alarm by conductors 119 and 120.

We claim as our invention:

1. In an electric welding machine, the combination of two electrodes which are movable toward and from each other, movable carriages on which said electrodes are yieldingly and also adjustably mounted, and mechanical means for moving the carriages toward each other and applying pressure to the electrodes for holding the same against opposite sides of the article to be welded, substantially as set forth.

2. In an electric welding machine, the combination of an electrode, a carriage for the same which is movable toward and from the welding position, a seat block which is secured to the carriage and lengthwise adjustable thereon, and a yielding connection between the seat block and the electrode, substantially as set forth.

3. In an electric welding machine, the combination of a table, a carriage movable thereon toward and from the welding position, a seat block lengthwise movable on said carriage and secured thereto by an adjusting device, an electrode lengthwise movable on the seat block, and a spring interposed between the seat block and the electrode and pressing the latter forwardly on the seat block, substantially as set forth.

4. In an electric welding machine, the combination of a carriage movable toward and from the welding position, a seat block which is lengthwise adjustable on said carriage, an electrode movable lengthwise on said block, a spring pressing the electrode inwardly on the block, and a slack connection between the electrode and the block for moving the electrode outwardly with the block and carriage, substantially as set forth.

5. In an electric welding machine, the combination of two carriages which are movable toward and from each other, positive means for actuating said carriages, electrodes movably mounted on said carriages, and yielding and also adjustable connections between the carriages and the electrodes, substantially as set forth.

6. In an electric welding machine, the combination of a welding electrode, means for moving the same toward and from the welding position, a driving mechanism, a shipper for starting and stopping the driving mechanism, and means for actuating the shipper from the electrode when the latter moves forwardly beyond the normal welding position, substantially as set forth.

7. In an electric welding machine, the combination of a welding electrode, means for moving the same toward and from the welding position, a driving mechanism, a shipper for starting and stopping the driving mechanism, a starting lever connected with said shipper, a latch for holding the starting lever, a spring-pressed rod connected with said latch, and a device on the electrode which actuates said rod and latch and causes the starting lever to be released when the electrode moves forwardly beyond its normal welding position, substantially as set forth.

8. In an electric welding machine, the combination of a welding electrode, means for moving the same toward and from the welding position, a driving mechanism, a shipper for starting and stopping the driving mechanism, means for actuating the shipper from the electrode when the latter moves forwardly beyond the normal welding position, a switch for opening and closing the circuit through the electrode, and means for opening the switch when the shipper is shifted, substantially as set forth.

9. In an electric welding machine, the combination of a welding electrode, means for moving the same toward and from the welding position, a driving mechanism, a shipper for starting and stopping the driving mechanism, a starting lever connected with said shipper, a latch for holding the starting lever, means actuated from the electrode when the latter moves forwardly beyond its normal welding position for releasing the latch, a switch for opening and closing the circuit through the electrode, and means for actuating the switch from the starting lever, substantially as set forth.

10. In an electric welding machine, the combination with the welding electrodes and the circuit in which they are arranged, of actuating mechanism for said electrodes, a starting and stopping device for said actuating mechanism, a main switch in said circuit actuated by said starting and stopping mechanism, and a secondary switch also arranged in said circuit and actuated periodically by said actuating mechanism in unison with said electrodes, substantially as set forth.

11. In an electric welding machine, the combination with the welding electrodes and the circuit in which they are arranged, of actuating mechanism for said electrodes, and a switch arranged in said circuit and comprising a pivoted lever, a yielding contact which is engaged and moved by said lever, and mechanism which moves said lever periodically against said contact and which is adjustable to change the throw of the lever and thus regulate the period of engagement of the lever with the contact, substantially as set forth.

12. In an electric welding machine, the combination with the welding electrodes and the circuit in which they are arranged, of actuating mechanism for said electrodes, a starting and stopping device for said actuating mechanism, a switch in said circuit having a movable arm which is connected with said starting and stopping device, and a spring connected with said movable arm and operating to open said switch and shift said starting and stopping device, substantially as set forth.

13. In an electric welding machine, the combination with electrodes and means for closing the same against the article to be welded, of a feed chuck provided with means for engaging the article to be welded and carrying the same between the electrodes when the latter are separated, and for releasing such presented article when it has been grasped by the electrodes and returning to engage the next following article to be welded, and means for oscillating said feed chuck in opposite directions to present alternate differently positioned articles in like position to the electrodes, substantially as set forth.

14. In an electric welding machine, the combination with electrodes and means for closing the same against the article to be welded, of a feed chuck which is movable toward and from the electrodes and provided with means for engaging and releasing the article to be welded, said chuck engaging the article to be welded when in its retracted position and moving forwardly and presenting the article between the electrodes when they are separated, and releasing the article when it has been grasped by the electrodes and returning to its retracted position and seizing the next following article to be welded, and means for oscillating said feed chuck in opposite directions to present alternate differently positioned articles in like position to the electrodes, substantially as set forth.

15. In an electric welding machine, the combination with electrodes and means for closing the same against the article to be welded, of a feed chuck capable of movement toward and from the electrodes and also of an oscillating movement about its axis, said chuck being provided with means for alternately engaging successive articles to be welded at right angles to each other and carrying each article between the electrodes when the latter are separated and releasing such presented article when it has been grasped by the electrodes, substantially as set forth.

16. In an electric welding machine, the combination with the welding electrodes, of a feed chuck capable of an oscillating and a forward and backward movement, said chuck being provided with link guides arranged at right angles to each other, and with feeding dogs adapted to enter the links and arranged at right angles to each other, substantially as set forth.

17. In an electric welding machine, the combination with the welding electrodes, of a feed chuck having link guides arranged at right angles to each other and feed dogs adapted to enter the links, said chuck being provided with a hollow shaft through which the chain to be welded passes to said guides and dogs, a carriage on which said shaft is journaled and which is movable toward and from the electrodes in the longitudinal direction of said shaft, and means for oscillating said shaft, substantially as set forth.

18. In an electric welding machine, the combination with the welding electrodes, of a feed chuck having guides which engage against the outer sides of the links and feed dogs which enter the links, said chuck being provided with a hollow shaft having an external gear, a reciprocating rack bar engaging said gear for oscillating said shaft, and a carriage on which said shaft is mounted and which is movable toward and from said electrodes, substantially as set forth.

19. In an electric welding machine, the combination with the welding electrodes, of a feed chuck capable of an oscillating and a forward and backward movement and having link guides which engage the outer sides of the links and hold the same in position, and feed dogs which enter the links and are arranged at right angles to each other to enter succeeding links, means for giving the chuck a quarter turn alternately in opposite directions to turn the chain correspondingly, and means for moving the chuck toward and from the electrodes, substantially as set forth.

20. In an electric welding machine, the combination with the welding electrodes, of a feed chuck having two pairs of grooved link guides arranged at right angles to each other and adapted to engage the outer sides of the links, and two feed dogs adapted to enter the links, one dog for each pair of guides and the two dogs arranged at right angles to each other, substantially as set forth.

Witness our hands in the presence of two subscribing witnesses.

LACHLAN E. McKINNON.
ALBERT W. SOUTHALL.

Witnesses:
  EDWARD WILHELM,
  C. B. HORNBECK.